United States Patent

Nabuurs

[11] Patent Number: 5,531,501
[45] Date of Patent: Jul. 2, 1996

[54] ROOF PANEL ASSEMBLY

[75] Inventor: Martinus W. M. Nabuurs, Overloon, Netherlands

[73] Assignee: Inalfa Industries, B.V., Venray, Netherlands

[21] Appl. No.: 369,242

[22] Filed: Jan. 6, 1995

[30] Foreign Application Priority Data

Jan. 11, 1994 [NL] Netherlands .................... 9400043

[51] Int. Cl.$^6$ ....................................... B60J 7/05
[52] U.S. Cl. ................................. 296/221; 296/223
[58] Field of Search ................... 296/221, 223, 296/216

[56] References Cited

U.S. PATENT DOCUMENTS 4,647,106  3/1987  Fürst ........................ 296/223

FOREIGN PATENT DOCUMENTS

| 3522923A1 | 1/1987 | Germany . | |
|---|---|---|---|
| 3603314A1 | 8/1987 | Germany . | |
| 3930756 | 3/1991 | Germany | 296/221 |
| 200520 | 8/1990 | Japan | 296/223 |

*Primary Examiner*—Dennis H. Pedder
*Attorney, Agent, or Firm*—Skjerven, Morrill, MacPherson, Franklin & Friel

[57] ABSTRACT

The invention relates to a roof panel assembly for a vehicle comprising a roof panel, which is adjustable from a position closing the opening in the roof to a first ventilating position, in which the roof panel has been pivoted upwards from its closed position about a pivot axis extending transversely to the longitudinal direction of the vehicle, and a second sliding position, in which the roof panel has at least partially been moved downwards from its closed position, in such a manner that the roof panel can be moved under the roof of the vehicle. The roof panel assembly is provided with a guide rail to be secured to the roof, along which an operating means is movable. A first lift arm, which is pivotable about a pivot axis located near the guide rail, is movably and pivotally connected with the roof panel by means of a pivot axis and is provided with a guide groove for receiving a cam connected with the operating means. When the operating means moves along the guide rail, with tile cam engaging in tile guide groove in the first lift arm, the first lift arm is pivoted about tile pivot axis so as to move tile roof panel towards the ventilating position. A second lift arm is fixedly connected with the panel, and said second lift arm is provided with a further guide groove for the cam of the operating means. In the at least substantially closed position of the panel an open end of the guide groove in the first pivotable lift arm is at least substantially contiguous to an open end of the guide groove in the second lift arm.

6 Claims, 2 Drawing Sheets

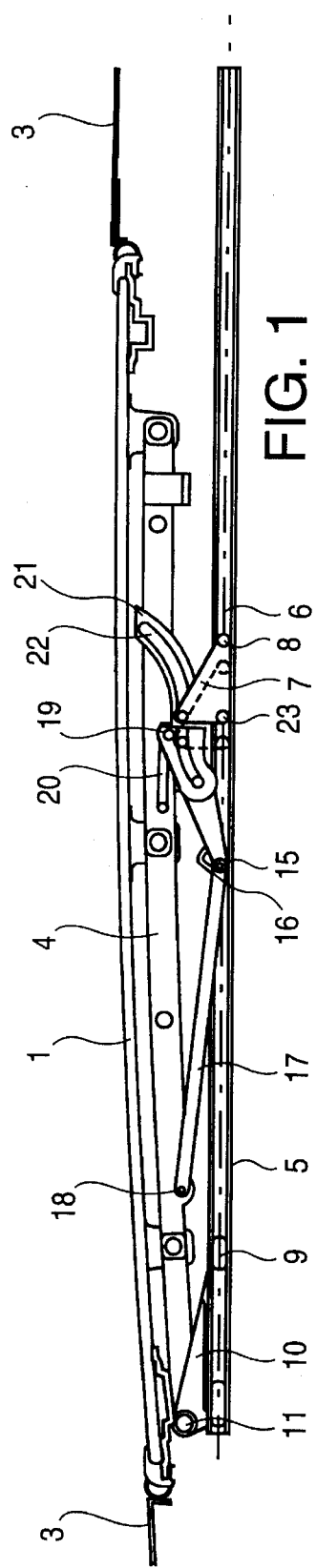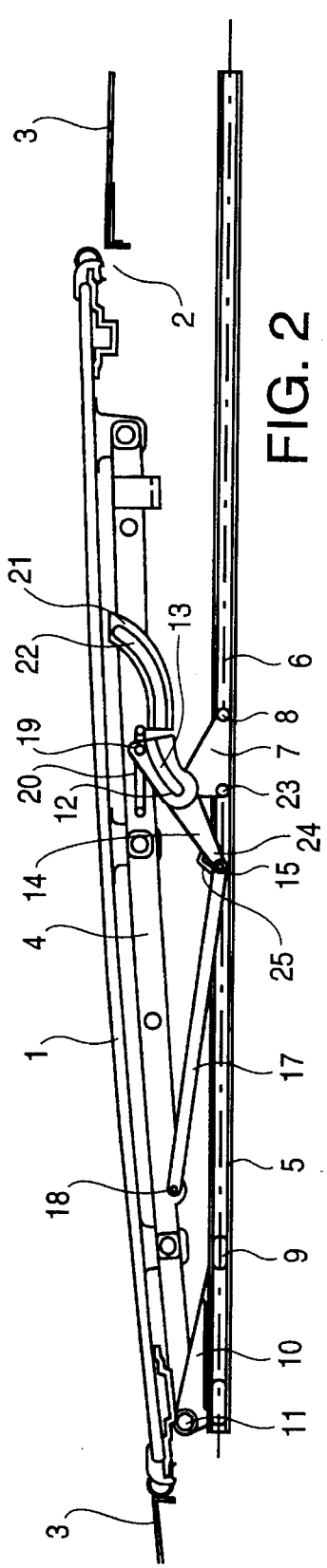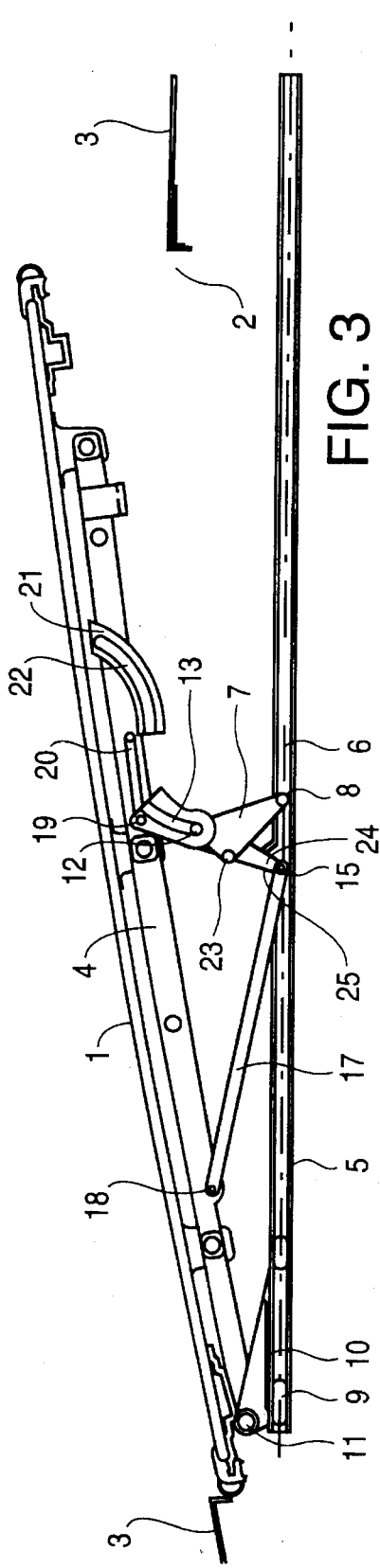

ROOF PANEL ASSEMBLY

The invention relates to a roof panel assembly for a vehicle comprising a roof panel, which is intended for closing an opening in a roof of a vehicle and which is adjustable from a position closing the opening in the roof to a first ventilating position, in which the roof panel has been pivoted upwards from its closed position about a pivot axis located near one end of said roof panel and extending transversely to the longitudinal direction of the vehicle, and a second sliding position, in which the roof panel has at least partially been moved downwards from its closed position, in such a manner that the roof panel can at least partially be moved under the roof of the vehicle, whereby said roof panel assembly is provided with at least one guide rail to be secured to the roof, along which an operating means to be driven by a motor or by hand is movable, whilst a first lift arm, which is pivotable about a pivot axis located near said guide rail, is movably and pivotally connected with the roof panel by means of a pivot axis and is provided with a guide groove for receiving a cam connected with said operating means, all this in such a manner that when the operating means moves along the guide rail, with the cam engaging in the guide groove in said first lift arm, said first lift arm is pivoted about said pivot axis so as to move the roof panel towards the ventilating position.

A roof panel construction of this type is known from Dutch Patent Application 9001686. With this known roof panel construction use is made of a lift arm which is provided with two guide grooves located one above the other and which is movable in the longitudinal direction of the guide rail.

This known construction is of complicated design and leads to a comparatively high mechanism by means of which the roof panel is adjustable between the various positions, which leads to a disadvantageous, high construction of the roof panel assembly.

According to the invention a second lift arm is fixedly connected with the panel, said second lift arm being provided with a further guide groove for the cam of said operating means, all this in such a manner that in the at least substantially closed position of the panel an open end of the guide groove in said first pivotable lift arm is at least substantially contiguous to an open end of the guide groove in said second lift arm, and that in the closed position of the roof panel the guide groove in said first lift arm extends at least along part of its length from the end contiguous to the guide groove in said second lift arm in a direction away from the roof panel, whilst in the closed position of the roof panel the guide groove in said second lift arm extends at least along part of its length from the end contiguous to the guide groove in said first lift arm in a direction towards the panel.

By using the construction according to the invention a simple and compact construction of the mechanism for adjusting the roof panel between the various positions can be realized whilst moving the operating means along a comparatively small distance with respect to the roof panel, so that the mechanism can be disposed at a place which is advantageous with a view to supporting the roof panel in a stable manner, being able to support the roof panel in an efficient manner in the various positions.

The invention will be explained in more detail hereafter with reference to an embodiment of the construction according to the invention diagrammatically illustrated in the accompanying Figures.

FIG. 1 is a sectional view of a roof panel assembly according to the invention, with the panel in closed position.

FIG. 2 is a sectional view corresponding with FIG. 1, showing the roof panel in a partially opened ventilating position.

FIG. 3 is a sectional view corresponding with FIGS. 1 and 2, showing the roof panel in the entirely opened ventilating position.

Figure 4:
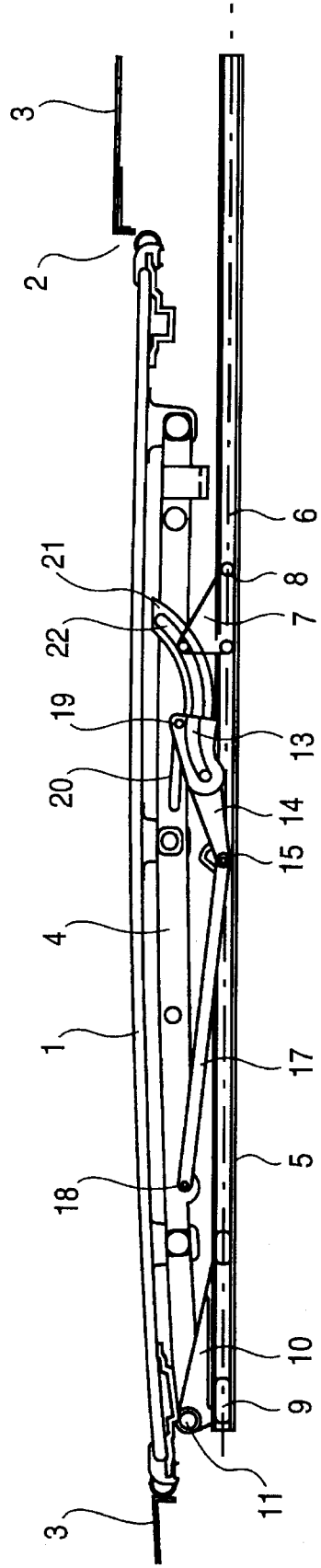
FIG. 4 is a sectional view corresponding with the preceding Figures, in which the roof panel has been moved slightly downwards from its closed position.

As is illustrated in the Figures, a roof panel assembly comprises a roof panel 1, which is suitable for closing an opening 2 in a manner known per se, said opening being provided in a roof of a vehicle 3. The roof panel 1 is secured to beams 4 provided near the longitudinal sides of the panel, that is the sides extending in the longitudinal direction of the vehicle. A guide rail 5 is fixed to the roof of the like near each side of the roof opening 2 extending in the longitudinal direction of the vehicle.

A sliding piece 6 is positioned in the guide rail 5, said sliding piece 6 being coupled, for example by means of a cable to be loaded in tension and in compression, to a motor by which said sliding piece 6 can be moved in the longitudinal direction of the rail 5.

An operating means 7, which is substantially triangular in the illustrated embodiment, is pivotally coupled to said sliding piece 6 by means of a pivot pin 8 extending horizontally and perpendicularly to the longitudinal direction of the guide rail 5.

A further sliding piece 9 is movable in the rail 5. Said sliding piece 9 supports an upwardly extending support 10, to which a beam 4 secured to the roof panel i is pivotally coupled by means of a horizontal pivot pin 11 extending perpendicularly to the longitudinal direction of the rail 5.

A projecting cam 12 is provided in a corner point of the operating means 7 some distance above the rail 5. In the position of the roof panel illustrated in FIGS. 2 and 3 said cam is positioned within a guide groove 13, which is provided in a lift arm 14. Said lift arm 14 is pivotable about a pivot pin 15, which is slidably positioned in said guide rail and which extends horizontally and perpendicularly to the longitudinal direction, said pivot pin 15 in the position of the various parts shown in FIGS. 1–3 abutting against a stop 16, which limits the movement of pivot pin 15 to the left, seen in FIGS. 1–3.

A track rod 17 is pivotally coupled to pin 15 with one end. The other end of said track rod 17 is coupled to a beam 4 at some distance from the pivot pin 11, by means of a pivot pin 18 extending parallel to said pivot pin 11.

A pin or cam 19 is secured to the upper end of lift arm 14, said pin or cam 19 being slidably accommodated within a slotted hole 20 provided in beam 4 and extending in the longitudinal direction of beam 4.

Secured to said beam is a further lift arm 21, in which a guide groove 22 is provided.

The ends of the lift arms 14 and 21 facing each other are slightly thinner than the other parts of said lift arms, such that the ends of the lift arms 14 and 21 facing each other overlap each other in the closed position of the roof panel shown in FIG. 1, whilst the ends of the grooves 13 and 22 facing each other are contiguous to each other and are substantially horizontal in this position. Groove 13 thereby extends downwards along a curvilinear path from its end contiguous to groove 22, in a direction away from groove 22. Groove 22 extends upwards along a curvilinear path from its end facing groove 13, in a direction away from groove 13.

As a result of this construction the cam 12 coupled to the operating means 7 will be moved through groove 13 when the guide means 6 is moved to the left, seen in the Figures, thereby pivoting the lift arm 14 in anti-clockwise direction about pin 15, so that the roof panel is pivoted upwards about pin 11.

When cam 12 has reached the end of groove 13 located furthest to the left, seen in the Figures, the operating means 7 will pivot about pin 8 upon further movement of the sliding piece 6 to the left, because a guide cam 23 secured to the operating means 7 and moving within the rail 5, can move upwards from the guide rail via a suitable opening. Also the lift arm 14 will thereby be pivoted onwards, from the position shown in FIG. 2 to the position shown in FIG. 3, whereby the cam 19 secured to the end of the lift arm 14 moves within the slotted hole 20 provided in beam 4.

The end position of lift arm 14 shown in FIG. 3 is determined by a cam 24 secured to the lift arm 14 at a point near pivot pin 15, which cam will abut against a stop portion 25 connected to rail 5.

In this position the panel is arranged in a position suitable for ventilating the passenger compartment or the like located under the roof 3.

From the position shown in FIG. 1, however, the sliding piece 6 and the operating means 7 coupled thereto can also be moved towards the right, seen in the Figures.

Figure 5:
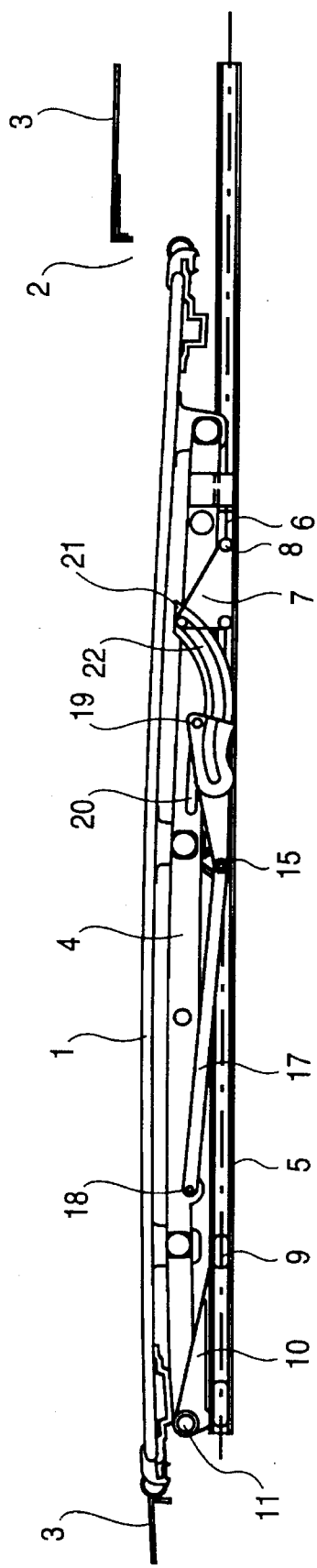
FIG. 5 is a sectional view corresponding with FIG. 4, in which the roof panel has been moved from its closed position to its lowermost position.

The cam 14 connected to the operating means 7 is thereby moved through the slot 22 in the lift arm 21 fixed to the roof panel, as a result of which the roof panel is pivoted downwards in anti-clockwise direction about pivot pin 11, as will be apparent from FIGS. 4 and 5. Thereby the cam 19 positioned within slotted hole 20 is moved toward the right-hand end of slotted hole 20, seen in the Figures. When the roof panel 1 has reached its entirely downward position shown in FIG. 5, the roof panel and all the parts connected thereto will be moved as a whole to the right under the roof 3 when the sliding piece moves further to the right, seen in the Figures.

I claim:

1. A roof panel assembly for a vehicle comprising a roof panel, which is intended for closing an opening in a roof of a vehicle and which is adjustable from a position closing the opening in the roof to a first ventilating position, in which the roof panel has been pivoted upwards from its closed position about a pivot axis located near one end of said roof panel and extending transversely to the longitudinal direction of the vehicle, and a second sliding position, in which the roof panel has at least partially been moved downwards from its closed position, in such a manner that the roof panel can at least partially be moved under the roof of the vehicle, whereby said roof panel assembly is provided with at least one guide rail to be secured to the roof, along which an operating means to be driven by a motor or by hand is movable, whilst a first lift arm, which is pivotable about a first pivot axis located in said guide rail, is movably and pivotally connected with the roof panel by means of a second pivot axis and is provided with a guide groove for receiving a cam connected with said operating means, all this in such a manner that when the operating means moves along the guide rail, with the cam engaging in the guide groove in said first lift arm, said first lift arm is pivoted about said first pivot axis so as to move the roof panel towards the ventilating position, characterized in that a second lift arm is fixedly connected with the panel, said second lift arm being provided with a further guide groove for the cam of said operating means, all this in such a manner that in the at least substantially closed position of the panel an open end of the guide groove in said first pivotable lift arm is at least substantially contiguous to an open end of the guide groove in said second lift arm, and that in the closed position of the roof panel the guide groove in said first lift arm extends at least along part of its length from the end contiguous to the guide groove in said second lift arm in a direction away from the roof panel, whilst in the closed position of the roof panel the guide groove in said second lift arm extends at least along part of its length from the end contiguous to the guide groove in said first lift arm in a direction towards the panel.

2. A roof panel assembly according to claim 1, characterized in that the ends of the contiguous guide grooves are at least substantially horizontally in line with each other in the closed position, whilst the cam connected to the operating means is located near said ends in that situation.

3. A roof panel assembly according to claim 1, characterized in that said operating means is pivotally connected to a sliding piece, which is movable along said guide rail, whereby said operating means, when said cam has reached a closed end of the guide grove of the first arm and said roof panel pivots to said first ventilating position, pivots upwards with respect to said sliding piece upon further movement of said sliding piece causing further pivoting of said first lift arm.

4. A roof panel assembly according to claim 3, characterized in that said operating means is provided with a guide cam, which is located at some distance from the pivotal connection of the operating means to the sliding piece and which is guided in the guide rail until the cam of the operating means has reached the closed end of the guide groove in said first lift arm, whereby the guide cam of the operating means can pivot out of the guide rail in this position, via an opening provided in said guide rail.

5. A roof panel construction according to claim 1, characterized in that a track rod is pivotable about the pivot axis of said first lift arm, which is located in said guide rail, said track rod extending in a direction away from said lift arm and being coupled to said roof panel in a point located some distance from the pivot axis of the roof panel.

6. A roof panel assembly according to claim 2, characterized in that said operating means is pivotally connected to a sliding piece, which is movable along said guide rail, whereby said operating means, when said cam has reached a closed end of the guide groove of the first lift arm and said roof panel pivots to said first ventilating position, pivots upwards with respect to said sliding piece upon further movement of said sliding piece causing further pivoting of said first lift arm.

\* \* \* \* \*